Sept. 1, 1931. W. G. WILSON 1,821,864

FLUID TIGHT JOINT AND METHOD OF MAKING

Filed Nov. 1, 1929

Inventor
Wylie G. Wilson
By his Attorney
Frank H Cent

Patented Sept. 1, 1931

1,821,864

UNITED STATES PATENT OFFICE

WYLIE G. WILSON, OF ELIZABETH, NEW JERSEY

FLUID TIGHT JOINT AND METHOD OF MAKING

Application filed November 1, 1929. Serial No. 403,977.

This invention relates to a fluid tight joint and to the method of making the same. The joint is particularly useful in connecting together sections of metal pipe or conduits used to transmit fluids under pressure and hence it will be disclosed in that connection. It will be obvious, however, that the invention may be used for other purposes.

Heretofore in the art, pipes have usually been joined by simple threaded sleeves, or by constructions involving more or less plastic gaskets, or accurately ground abutting surfaces. Simple threaded sleeves are not customarily used for large sizes of pipe because of the difficulty of making a leak tight joint and the difficulty of rotating the pipe in making the joint. Also joints made with simple threaded sleeves have a rough interior, and the relative position of the two sections of pipe cannot be accurately predetermined. Gaskets of more or less plastic material are apt to be blown out by high pressure; they deteriorate with age and heat; and in many cases great force must be used in clamping together the parts with which the gasket is associated. With this type of joint also, the relative position of the two sections of pipe cannot be accurately predetermined. Accurately ground abutting surfaces are expensive to manufacture; it is difficult to construct them to hold high pressures; and such joints are not suitable in many cases. Other types of joints have been proposed, but the types above referred to are the ones that are most extensively used.

The general object of the present invention is to provide a joint structure and/or method of making a joint which will be reliable and permanently fluid tight and can be manufactured at low cost by ordinary commercial methods.

Another object of the invention is to provide a joint structure and/or method of making a joint which will withstand high fluid pressure without requiring greater manufacturing precision or greater care of assembly than is involved in ordinary commercial work.

Another object of the invention is to provide for alignment of the parts to be joined without any special care in assembly.

A still further object of the invention is to provide a joint structure and/or method of making a joint in which the final position of the parts joined (relative to one another) can be accurately predetermined.

Other objects of the invention will be obvious from the following disclosure.

Various difficulties of the prior art are overcome by the present invention which is disclosed in a form in which two pieces of pipe or the like are sealed together by a continuous one-piece sealing ring having on its interior surface two oppositely inclined annular sealing surfaces, one of which cooperates with each end of the pipe. The pipe ends are provided with cylindrical projections having more or less square annular corners that are adapted to exert pressure on the inclined sealing surfaces of the sealing ring and slide over such surfaces as the ends of the pipe are drawn together. In this way the annular corners on the ends of the pipe are lapped into sealing fit with the sealing surfaces of the ring, and the ring is circumferentially expanded as a unit, thereby setting up a heavy permanent sealing pressure between the annular corners on the pipe and the sealing surfaces of the ring.

Figure 1:
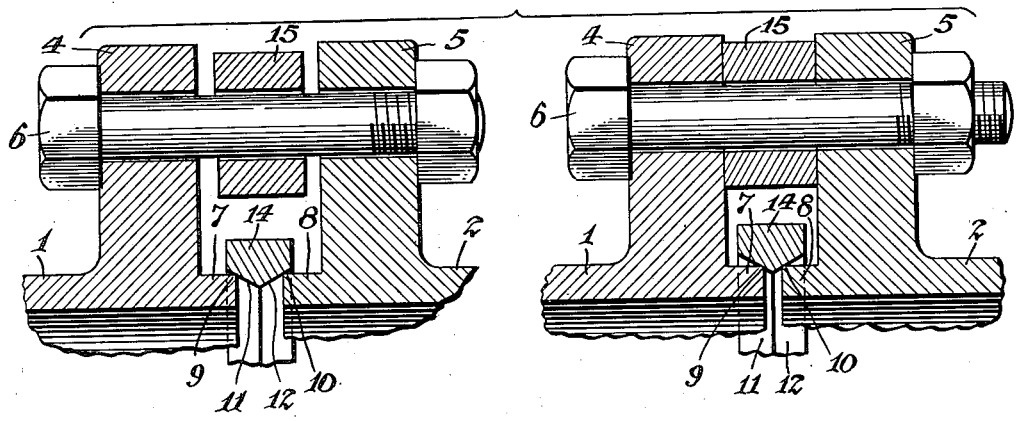
Fig. 1 is a fragmentary sectional view taken longitudinally of the pipe, the left-hand portion of the figure showing the parts assembled preparatory to making the joint and the right-hand portion of the figure showing the completed joint.

Reference will now be had to Fig. 1. Sections of pipe 1 and 2 that are to be joined are provided with suitable means for drawing the ends together, such as ends of fittings having annular flanges 4 and 5 adapted to be drawn together by bolts 6, as is well understood in the art. The pipe ends are provided with cylindrical projections 7 and 8 having exterior annular corners 9 and 10 adapted to engage inclined surfaces 11 and 12 of a sealing ring 14. The parts are assembled, as shown in the left-hand portion of Fig. 1 with the surfaces 11 and 12 of the sealing ring contacting with the corners 9 and 10 of the pipe ends. Ring 11 is a continuous solid ring of metal, preferably similar to the metal of the pipe. The metal of the ring is preferably resilient and is preferably malleable or worked metal, or ductile metal. The ring is so proportioned and of such material that upon sufficient pressure being applied to the surfaces 11 and 12 the ring expands circumferentially as a unit.

After the parts have been assembled, as shown in the left-hand portion of Fig. 1, the flanges 4 and 5 are drawn together by bolts 6. This causes the corners 9 and 10 to exert pressure on the surfaces 11 and 12, which pressure increases in value as the flanges are drawn together. Accordingly, the corners 9 and 10 slide over the surfaces 11 and 12 while exerting considerable pressure on those surfaces. This sliding of surfaces under pressure causes local action on the metal of the sliding surfaces, which is in effect a local cold working that somewhat densifies the surface metal and removes machining irregularities and produces a sealing fit capable of withstanding high pressure. For convenience, this local action by which the sealing fit is produced will be referred to as lapping action. The pressure exerted on the surfaces 11 and 12 also expands the ring as a unit, and thus permanent sealing pressure is established at the corners 9 and 10 due to the resiliency of the metal of the sealing ring. When I say the ring is expanded as a unit, I mean that the ring is expanded throughout its entire length. In fact, in actual practice with a ring of the proportions shown in the drawings, the geometrical configuration of the ring's cross section (taken as in the drawings) is maintained insofar as the eye can detect, but the circumference of the ring is increased. In such a case the geometrical change of the ring in actual practice is similar in kind (not necessarily degree) to the geometrical change caused by an increase in temperature of the ring.

In the finished joint of Fig. 1 the corners 9 and 10 are located near the annular apex formed by surfaces 11 and 12 and the ring 14 has been so expanded that its circumference is appreciably greater than its normal circumference. The resiliency of the ring causes it to exert a heavy constricting pressure on the corners 9 and 10 and since the area of contact between the surfaces 11 and 12 and the corners is quite small, the sealing pressure per unit area is very large. If desired, a collar 15 may be placed around each of the bolts 6 so that in the completed joint the flanges 4 and 5 abut against the ends of the collars 15. Such collars accurately predetermine the final position of the two sections of pipe, and the construction is such that a rigid mechanical connection is formed between the two sections of pipe independently of the sealing ring 14. Any bending stresses which may be put upon the pipe are resisted at the joint by the bolted flanges and hence such stresses cannot impair the seal. Also, the flanges so reenforce the ends of the pipe that their size remains fixed as the ring is expanded.

Figure 2:
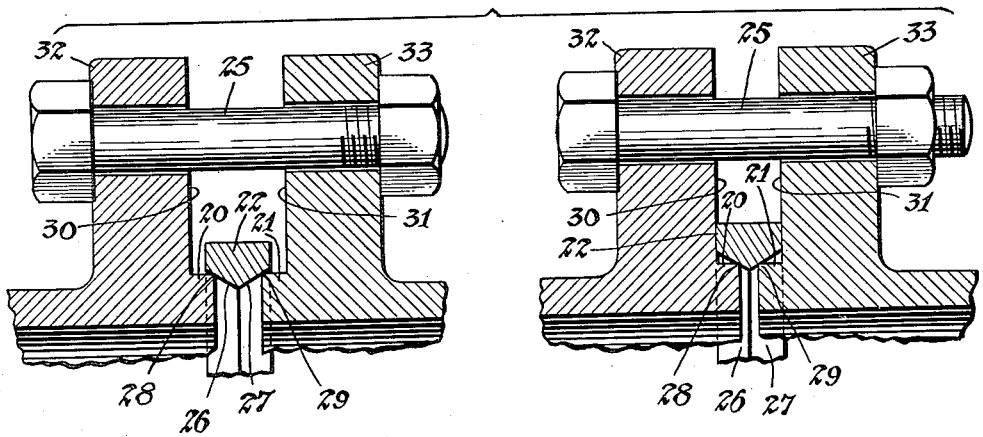
Fig. 2 is a view similar to Fig. 1 showing a modified form of the invention.

The construction shown in Fig. 2 is similar to that shown in Fig. 1, but the pipe ends are provided with cylindrical projections 20 and 21, each of which is less than half the axial length of sealing ring 22. The parts are initially assembled as shown in the left-hand portion of Fig. 2 and then the ends of the pipes are drawn together by any suitable means such as bolts 25. Tapered sealing surfaces 26 and 27 of the sealing ring are lapped into sealing fit with annular corners 28 and 29 on the pipe ends, and the sealing ring is circumferentially expanded as in Fig. 1. Due to the smaller length of the projections 20 and 21, the surfaces 30 and 31 of the flanges 32 and 33 are drawn against the ends of the sealing ring 22 so that a certain amount of seal is produced at the ends of the sealing ring. With this construction also, the final position of the two sections of pipe may be accurately predetermined, and there is a rigid mechanical connection between the sections of the pipe independently of the contact at the sealing surfaces 26 and 27. Hence any bending stresses that may be put upon the pipe will not shift the position of the corners 28 and 29 with respect to the sealing surfaces 26 and 27 and thus impair the seal.

The wedging action which is exerted on the sealing ring as the joint is drawn up is one which has great mechanical advantage, and hence large sealing pressures may be exerted with relatively small forces applied by the bolts 6 or 25, or other means used to draw the pipe ends together. The amount of mechanical advantage obtained depends, of course, upon the angle of inclination of the sealing surfaces on the sealing ring. If a small angle be used, (i. e., measured from the axis of the pipe) a large mechanical advantage is obtained, but the sealing ring must have a relatively long length and the ends of the pipe must be moved a relatively large distance in order to obtain a given expansion of the ring. On the other hand, if the angle of the sloping surfaces be large, the conditions are just the reverse. An angle should be used which best suits the particular purpose, but I have found that for many purposes an angle of 16 degrees is satisfactory since it is very desirable that the sealing ring be short measured axially of the pipe.

The desirability of a short sealing ring will be obvious from the following considerations. As a practical proposition there is a maximum permissible pull which can be exerted by the bolts which draw the flanges together. This maximum permissible pull can expand a sealing ring of not over a certain cross-sectional area. Accordingly, the shorter the sealing is made, the thicker it may be made; and the thicker the ring, the higher pipe line pressure it will withstand. Also, the shorter the ring, the more perfectly its ends will remain parallel to each other during expansion of the ring, and hence the more perfectly the flanges will grip the ends of the ring. The more perfectly the flanges grip the ends of the ring, the more positively they support the ring against expansion by pressure within the pipe line. The length of the ring is such as to take care of manufacturing variations in the size of the ring and the size of the pipe, i. e. to insure that the end of the pipe will enter the ring and that it will encounter a sufficient length of tapered surface on the ring to give adequate expansion of the ring and adequate lapping action between the ring and the pipe end.

As the parts are assembled preparatory to drawing up the joint, the sealing ring is floating and acts to automatically align the pipe ends with each other and with the sealing ring. The contacting surfaces are so effectively lapped into a sealing fit that ordinary commercial machining methods are sufficiently accurate in making the parts, and the joint does not require great care in assembly. In fact, in actual practice, a fluid tight seal is produced by the time a fraction of the lapping movement has been completed.

The exact dimensions and material of the ring are not important so long as they are such as to permit the ring to act as above described. In general, the material of the ring must have tensile strength and elasticity and is preferably a malleable or worked metal, or ductile metal, similar to, or somewhat softer than the pipes to be joined. Thus, a steel ring is preferably used for steel pipe and a brass ring for brass pipe. Either steel or brass rings might be used for cast iron pipe. The cross sectional proportions of the ring (i. e. axial length to cross axial thickness) and the material of the ring are such that the ring expands as a whole when pressure is applied to the sealing surfaces, as has previously been pointed out, but the exact proportions and dimensions may be varied considerably. The ring may have a thickness slightly less than the thickness of the pipe and a length slightly greater than twice its thickness.

The invention may assume forms other than those specifically disclosed and may be used in connections other than those specifically disclosed. Accordingly, the present disclosure is to be considered as illustrative in compliance with the patent statutes and is not to be considered as limiting.

What I claim is:

1. A fluid tight joint structure comprising two elements to be joined, each element being provided with an exterior annular corner, a sealing ring of resilient material resistant to deformation as a unit and having inclined interior annular surfaces engaging said corners, and means to move the elements toward one another to lap said corners into sealing fit with the ring and to circumferentially expand the ring as a unit to establish permanent sealing pressure on said corners, the ring being of suitable length and thickness and having appropriate inclined surfaces so that the prescribed expansion and lapped sealed joint is effected in the assembly.

2. A fluid tight joint structure comprising two elements to be joined, each element being provided with an exterior annular corner, a resilient worked metal sealing ring resistant to deformation as a unit and having inclined interior annular surfaces engaging said corners, and means to move the elements relative to the sealing ring to form a lapped sealing fit with said inclined surfaces and to circumferentially expand the ring as a unit to establish permanent sealing pressure over the lapped areas, the ring being of suitable length and thickness and having appropriate inclined surfaces so that the prescribed expansion and lapped seal joint is effected in the assembly, the ring and the elements having surfaces which abut and determine the final position of the parts independently of the engagement of said corners with the sealing ring.

In testimony whereof I affix my signature.

WYLIE G. WILSON.